United States Patent
Zhou

(10) Patent No.: US 12,299,935 B2
(45) Date of Patent: May 13, 2025

(54) IMAGE PROCESSING METHOD, AND ELECTRONIC DEVICE

(71) Applicant: Rockchip Electronics Co., Ltd., Fuzhou (CN)

(72) Inventor: Xiangyun Zhou, Fuzhou (CN)

(73) Assignee: Rockchip Electronics Co., Ltd., Fujian (CN)

( * ) Notice: Subject to any disclaimer, the term of this patent is extended or adjusted under 35 U.S.C. 154(b) by 334 days.

(21) Appl. No.: 17/899,642

(22) Filed: Aug. 31, 2022

(65) Prior Publication Data

US 2023/0075262 A1 Mar. 9, 2023

(30) Foreign Application Priority Data

Sep. 1, 2021 (CN) .......................... 202111020521.X

(51) Int. Cl.
*G06K 9/00* (2022.01)
*G06T 3/4015* (2024.01)
(Continued)

(52) U.S. Cl.
CPC .............. *G06T 7/90* (2017.01); *G06T 3/4015* (2013.01); *G06T 5/73* (2024.01);
(Continued)

(58) Field of Classification Search
CPC .......... G06T 7/90; G06T 5/73; G06T 3/4015; G06T 2207/10024; G06T 2207/20032; G06T 2207/20221
See application file for complete search history.

(56) References Cited

U.S. PATENT DOCUMENTS 8,068,145 B1 11/2011 Tovchigrechko
8,755,640 B2 * 6/2014 Saito .................... G06T 3/4015
382/300
(Continued)

FOREIGN PATENT DOCUMENTS

CN 104170376 A 11/2014
CN 104539919 A 4/2015
(Continued)

OTHER PUBLICATIONS

Hu, Peng et al., Comparison and analysis of RGB and RGBW display technology and suggestions for 4K standardization, Video Engineering, Dec. 31, 2017, pp. 145-149, Entire document, vol. 41, No. 9/10, China Academic Journal Electronic Publishing House, CN.

(Continued)

Primary Examiner — Avinash Yentrapati
(74) Attorney, Agent, or Firm — IPRTOP LLC

(57) ABSTRACT

An image processing method, and electronic device are provided. The image processing method includes: obtaining a raw RGBW image by an RGBW sensor; processing the raw RGBW image by a pre-processor to obtain a raw RGB image; processing the raw RGB image by an image signal processor to obtain a target image. By adopting the image processing method of the present disclosure, conventional image processing modules are compatible with RGBW sensors without modification, and thus do not need to be replaced in practical applications, which saves hardware costs and facilitates product upgrades.

18 Claims, 8 Drawing Sheets

(51) Int. Cl.
*G06T 5/73* (2024.01)
*G06T 7/90* (2017.01)
(52) U.S. Cl.
CPC ............... *G06T 2207/10024* (2013.01); *G06T 2207/20032* (2013.01); *G06T 2207/20221* (2013.01)

(56) References Cited

U.S. PATENT DOCUMENTS

| | | | | |
|---|---|---|---|---|
| 9,147,230 | B2* | 9/2015 | Saito | H04N 9/646 |
| 11,081,081 | B2* | 8/2021 | Li | G09G 5/02 |
| 11,729,532 | B2* | 8/2023 | Moon | H01L 27/14609 |
| | | | | 348/222.1 |
| 2005/0129309 | A1 | 6/2005 | Kang et al. | |
| 2011/0090381 | A1 | 4/2011 | Cote et al. | |
| 2012/0257821 | A1* | 10/2012 | Saito | H04N 25/133 |
| | | | | 382/162 |
| 2013/0057734 | A1* | 3/2013 | Tachi | H04N 25/615 |
| | | | | 348/E9.037 |
| 2013/0216130 | A1* | 8/2013 | Saito | G06T 5/90 |
| | | | | 382/167 |
| 2013/0272605 | A1* | 10/2013 | Saito | H04N 23/843 |
| | | | | 382/167 |
| 2014/0328538 | A1* | 11/2014 | Kim | H04N 25/133 |
| | | | | 382/167 |
| 2015/0029358 | A1* | 1/2015 | Kaizu | H04N 23/843 |
| | | | | 348/223.1 |
| 2015/0103212 | A1* | 4/2015 | Saito | H04N 25/133 |
| | | | | 348/242 |
| 2015/0363916 | A1 | 12/2015 | Botzas et al. | |
| 2017/0098296 | A1* | 4/2017 | Chong | G06T 3/4015 |
| 2017/0366723 | A1* | 12/2017 | Kurata | H04N 25/135 |

FOREIGN PATENT DOCUMENTS

| | | |
|---|---|---|
| CN | 111669482 A | 9/2020 |
| CN | 111741277 | 10/2020 |
| CN | 111861964 | 10/2020 |
| JP | WO2016098641 A | 9/2017 |

OTHER PUBLICATIONS

Lai, CC et al., A Modified Stripe-RGBW TFT-LCD with image-processing engine for mobile phone displays, IEEE Transactions on Consumer Electronics, Nov. 2007, pp. 1628-1633, Entire document, vol. 53, No. 4, Institute of Electrical and Electronics Engineers, US.

* cited by examiner

IMAGE PROCESSING METHOD, AND ELECTRONIC DEVICE

CROSS REFERENCE TO RELATED APPLICATION

The present application claims the benefit of priority to Chinese Patent Application No. CN 202111020521X, entitled "image processing method, medium, processor, and electronic device", filed with CNIPA on Sep. 1, 2021, the disclosure of which is incorporated herein by reference in its entirety for all purposes.

FIELD OF TECHNOLOGY

The present disclosure generally relates to the field of image processing and, in particular, to an image processing method, and electronic device.

BACKGROUND

The RGBW technology adds white (W) sub-pixels to traditional red-green-blue (RGB) sub-pixels, thereby achieving a four-color pixel design. The RGBW technology substantially improves the light transmission rate of liquid crystal display (LCD) panels, and as a result, LCD panels adopting the RGBW technology consume much less power when operating with a given brightness.

The RGBW technology uses a lens, an RGBW sensor and an image signal processor (ISP) to obtain a target image. Specifically, the lens acquires a light signal and the RGBW sensor converts the light signal to a raw RGBW image, and then the image signal processor processes the raw RGBW image to obtain the target image. However, the inventor found(s) that the RGBW technology requires the image signal processor to process the raw RGBW image, but traditional image signal processors for processing raw RGB image are not compatible with the RGBW sensor, and therefore need to be modified or replaced in practical applications, which increases hardware costs and slows down product upgrades.

SUMMARY

The present disclosure provides an image processing method, applied to an image processing system, wherein the image processing system including an RGBW sensor, a pre-processor, and an image signal processing module, the image processing method including: obtaining a raw RGBW image by the RGBW sensor; processing the raw RGBW image by the pre-processor to obtain a raw RGB image; and processing the raw RGB image by the image signal processing module to obtain a target image.

In an embodiment, the image signal processing module is not able to directly process the raw RGBW image.

In an embodiment, processing the raw RGBW image by the pre-processor to obtain the raw RGB image includes: performing a demosaicing process, by the pre-processor, on the raw RGBW image to directly convert the raw RGBW image into the raw RGB image.

In an embodiment, processing the raw RGBW image by the pre-processor to obtain the raw RGB image includes: obtaining a first grayscale image, by the pre-processor, based on a W channel of the raw RGBW image; and obtaining the raw RGB image, by the re-processing module, based on the first grayscale image and R, G, and B channels of the raw RGBW image, wherein the raw RGB image has a first resolution identical to that of the first grayscale image, or has a second resolution different from that of the first grayscale image.

In an embodiment, the pre-processor determines a resolution of the raw RGB image based on lighting conditions corresponding to the raw RGBW image.

In an embodiment, the pre-processor obtains the first grayscale image by: separating the W channel of the raw RGBW image from the raw RGBW image; and performing interpolation on the W channel of the raw RGBW image to obtain the first grayscale image.

In an embodiment, performing interpolation on the W channel of the raw RGBW image to obtain the first grayscale image includes: obtaining high frequency gradients in horizontal and vertical directions respectively for each pixel in the W channel of the raw RGBW image; obtaining interpolation weights in the horizontal and vertical directions respectively for each pixel in the W channel of the raw RGBW image based on the high frequency gradients; obtaining interpolated components in the horizontal and vertical directions respectively for each pixel in the W channel of the raw RGBW image; and performing weighted interpolation fusions in the horizontal and vertical directions respectively to obtain the first grayscale image based on the interpolation weights and interpolated components in the horizontal and vertical directions for each pixel in the W channel of the raw RGBW image.

In an embodiment, obtaining the raw RGB image, by the pre-processor, based on the first grayscale image and the R, G, and B channels of the raw RGBW image includes: obtaining a first RGGB image according to the R, G, and B channels of the raw RGBW image; and fusing the first grayscale image and the first RGGB image to obtain the raw RGB image.

In an embodiment, wherein fusing the first grayscale image and the first RGGB image, by the pre-processor, to obtain the raw RGB image includes: obtaining first color images based on the first RGGB image, wherein each of the first color images corresponds to an R, G, or B channel of the first RGGB image; downsampling the first grayscale image to obtain a second grayscale image, wherein the second grayscale image has the same dimensions as the first color images, and the second grayscale image has the second resolution; differentially fusing the second grayscale image with the first color images to obtain three first differential images, each of which corresponds to one of the R, G, and B channels; fusing the three first differential images to obtain a second RGGB image; and performing interpolation on the second RGGB image, and fusing an interpolated image resulted from the interpolation with the first grayscale image to obtain the raw RGB image, wherein the raw RGB image has the first resolution; or fusing the second RGGB image with the second grayscale image to obtain the raw RGB image, wherein the raw RGB image has the second resolution.

In an embodiment, after obtaining the three first differential images, the method further includes: filtering the three first differential images by the pre-processor.

In an embodiment, the filtering of a selected first differential image of the three first differential images includes: performing, by the pre-processor, Gaussian filtering on the selected first differential image and calculating a mean gradient of the selected first differential image; calculating, by the pre-processor, a first mean and variance of the selected first differential image after downsampling the selected first differential image, and then performing an upsampling based on the downsampled image in combination with the first mean and variance to obtain a second mean and variance after upsampling, by the pre-processor; obtaining, by the pre-processor, filter coefficients based on the mean gradient, and the second mean and variance after upsampling; and filtering, by the pre-processor, the selected first differential image according to the filter coefficients.

In an embodiment, fusing the first grayscale image and the first RGGB image, by the pre-processor, to obtain the raw RGB image includes: interpolating the first RGGB image, by the pre-processor, to obtain a third RGGB image, wherein the third RGGB image has the same dimensions as the first grayscale image; and fusing the first grayscale image with the third RGGB image, by the pre-processor, to obtain the raw RGB image, wherein the raw RGB image has the first resolution.

In an embodiment, fusing the first grayscale image with the third RGGB image, by the pre-processor, to obtain the raw RGB image includes: obtaining second color images based on the third RGGB image, wherein each of the second color images corresponds to an R, G, or B channel of the third RGGB image; differentially fusing the first grayscale image with the second color images to obtain three second differential images, each of which corresponds to one of the R, G, and B channels; fusing the three second differential images to obtain a fourth RGGB image; and fusing the first grayscale image and the fourth RGGB image to obtain the raw RGB image.

In an embodiment, the image processing system further includes a post-processor, and the image processing method further includes: before processing the raw RGBW image by the pre-processor to obtain the raw RGB image, post-processing the raw RGB image by the post-processor to increase clarity of the raw RGB image.

In an embodiment, post-processing the raw RGB image by the post-processor includes: obtaining, by the post-processor, a luminance map of the raw RGB image as a first luminance map; obtaining, by the post-processor, a high frequency component of the first luminance map; superimposing, by the post-processor, the high frequency component to the first luminance map in accordance with corresponding weights to obtain a second luminance map; and superimposing, by the post-processor, a difference between the second luminance map and the first luminance map to the raw RGB image.

The present disclosure further provides another image processing method applied to an image processor, the image processing method including: obtaining a raw RGBW image by the image processor; obtaining a first grayscale image based on a W channel of the raw RGBW image by the image processor; and obtaining a raw RGB image based on the first grayscale image and R, G, and B channels of the raw RGBW image by the image processor.

The present disclosure further provides an electronic device, including: a pre-processor configured to receive a raw RGBW image from a RGBW sensor, and process the raw RGBW image to obtain a raw RGB image; and an image signal processor configured to process the raw RGB image to obtain a target image.

In an embodiment, the image signal processor is configured to be not able to directly process the raw RGBW image.

In an embodiment, the pre-processor is configured to perform a demosaicing process on the raw RGBW image to directly convert the raw RGBW image into the raw RGB image.

In an embodiment, the pre-processor is configured to obtain a first grayscale image based on a W channel of the raw RGBW image; and obtain the raw RGB image based on the first grayscale image and R, G, and B channels of the raw RGBW image, wherein the raw RGB image has a first resolution identical to that of the first grayscale image, or has a second resolution different from that of the first grayscale image.

As described above, the image processing method described in one or more embodiments of the present disclosure has the following beneficial effects:

In the image processing method, after obtaining the raw RGBW image, the raw RGBW image is pre-processed by the pre-processor to obtain the raw RGB image, and therefore the image signal processor only needs to process the raw RGB image. Thus, by adopting the image processing method of the present disclosure, conventional image processing modules are compatible with RGBW sensors without modification, and thus do not need to be replaced in practical applications, which saves hardware costs and facilitates product upgrades.

In addition, the raw RGBW image obtained from the RGBW sensor is consistent with ones obtained from a standard RGB sensor, and even has better color and noise performance. In addition, the resolution of the target image obtained by the image processing method is flexible and variable, and the format of the corresponding pattern can be adjusted as needed.

DETAILED DESCRIPTION

Figure 1A:
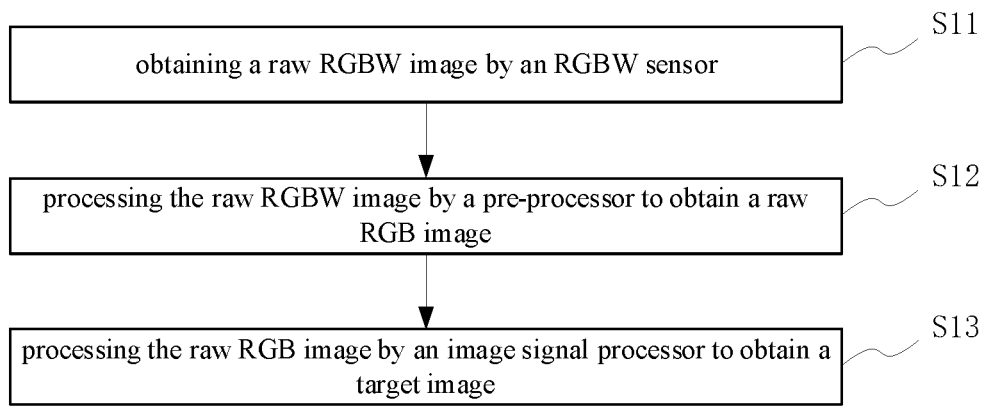
FIG. 1A shows a flowchart of an image processing method according to one embodiment of the present disclosure.

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component can be changed as needed, and the components' layout may also be more complicated. In addition, in this document, relationship terms such as "first", "second", etc. are used only to distinguish one entity or operation from another, and do not necessarily require or imply any such actual relationship or sequence between these entities or operations.

The RGBW technology uses a lens, an RGBW sensor and an image signal processor (ISP) to obtain a target image. Specifically, the lens acquires a light signal and the RGBW sensor converts the light signal to a raw RGBW image, and then the image signal processor processes the raw RGBW image to obtain the target image. However, the RGBW technology requires the image signal processor to process the raw RGBW image, but traditional image signal processors for processing image are not compatible with the RGBW sensor, and therefore need to be modified or replaced in practical applications, which increases hardware costs and slows down product upgrades. To address this issue, the present disclosure provides an image processing method, applied to an image processing system, wherein the image processing system includes an RGBW sensor, a pre-processor, and an image signal processor. Specifically, referring to FIG. 1A, the image processing method includes:

S11, obtaining a raw RGBW image by the RGBW sensor. The raw RGBW image is an image obtained by the RGBW sensor and, in some examples, includes an array of RGWB pixels. FIG. 1B is an exemplary raw RGWB image according to one embodiment of the present disclosure. Optionally, the raw RGBW image is a raw image in an RGBW Bayer format.

S12, processing the raw RGBW image by the pre-processor to obtain a raw RGB image. In one example, the raw RGB image includes an array of RGB pixels. FIG. 1C is an exemplary raw RGB image according to one embodiment of the present disclosure. Optionally, the raw RGB image is a raw image in an ordinary Bayer format.

S13, processing the raw RGB image by the image signal processing module to obtain a target image. Specifically, the processing of the raw RGB image in operation S13 may involve, for example, noise removal, color interpolation, color correction, etc.

Optionally, the image signal processor of the present disclosure is unable to directly process raw RGBW images, and is able to directly process raw RGB images. In other words, the present disclosure utilizes an existing image signal processor capable of processing raw RGB images but NOT raw RGBW images, and therefore there is no need to develop an image signal processor having the ability to directly process raw RGBW images.

It should be noted that the above operations S11 to S12 can also be realized by modules other than the image signal processor, in which case the image signal processor performs only the operations S13. Thus, it can be seen that the image processing method described herein makes traditional image signal processors used for processing raw RGB images compatible with RGBW sensors as well, and thus making RGBW sensors compatible with all kinds of image signal processors, which reduces hardware costs and facilitates product upgrades.

In an embodiment, processing the raw RGBW image by the pre-processor to obtain the raw RGB image includes: performing a demosaicing process, by the pre-processor, on the raw RGBW image to directly convert the raw RGBW image into the raw RGB image. Specifically, the pre-processor directly separates an R channel, a G channel, and a B channel from the raw RGBW image respectively to obtain the raw RGB image.

Figure 2:
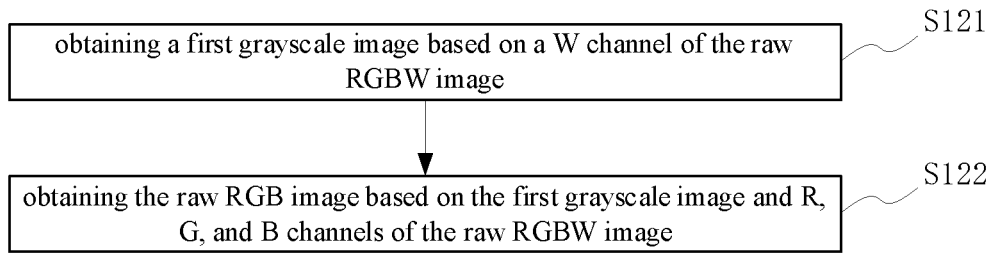
FIG. 2 shows a flowchart of operation S12 of an image processing method according to one embodiment of the present disclosure.

Referring to FIG. 2, in an embodiment of the present disclosure, the pre-processor processes the raw RGBW image to obtain the raw RGB image by the following operations:

S121, obtaining a first grayscale image based on a W channel of the raw RGBW image. Optionally, the first grayscale image has the same size as the raw RGBW image.

S122, obtaining the raw RGB image based on the first grayscale image and the R, G, and B channels of the raw RGBW image. For example, the R, G, and B channels of the raw RGBW image and the first grayscale image are fused and then reconstruction is performed to obtain the raw RGB image. Optionally, the raw RGB image has a first resolution identical to the first grayscale image, or has a second resolution different from the first grayscale image, with the second resolution lower than the first resolution.

Optionally, the pre-processor determines the resolution of the raw RGB image based on lighting conditions corresponding to the raw RGBW image. Specifically, when the lighting conditions reflected by the raw RGBW image are good, for example, the raw RGBW image is an image taken in daylight, the pre-processor determines that the resolution of the raw RGB image is the first resolution, which in one example is a full resolution. When the lighting conditions reflected by the raw RGBW image are poor, for example, the raw RGBW image is an image taken under low lighting conditions at night, the pre-processor determines that the resolution of the raw RGB image is the second resolution.

The present disclosure provides a method for processing the raw RGBW image to obtain the raw RGB image; however, the present disclosure is not limited to this. Other ways of obtaining the RGB image based on the raw RGBW image can also be adopted, and as long as the process of obtaining the RGB image is implemented by modules other than the image signal processor, the purpose of the present disclosure is achieved.

In addition, operation S122 may be performed to obtain a raw RGB image with the same resolution as the first grayscale image (full resolution), or a raw RGB image with a second resolution different than the first resolution.

Figure 3A:
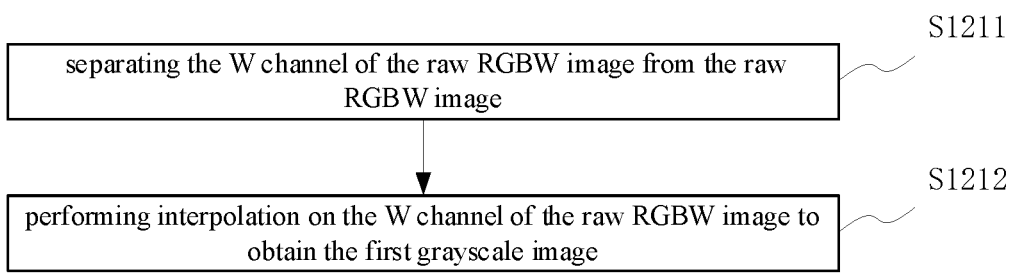
FIG. 3A shows a flowchart of operation S121 of an image processing method according to one embodiment of the present disclosure.

Referring to FIG. 3A, in an embodiment of the present disclosure, the pre-processor obtains the first grayscale image by the following operations:

S1211, separating the W channel of the raw RGBW image from the raw RGBW image. For example, the W channel of the raw RGBW image may be obtained by a down-sampling separation.

S1212, performing interpolation on the W channel of the raw RGBW image to obtain the first grayscale image. Optionally, the interpolation on the W channel of the raw RGBW image may be achieved by a demosaicing process or other means.

Figure 3B:
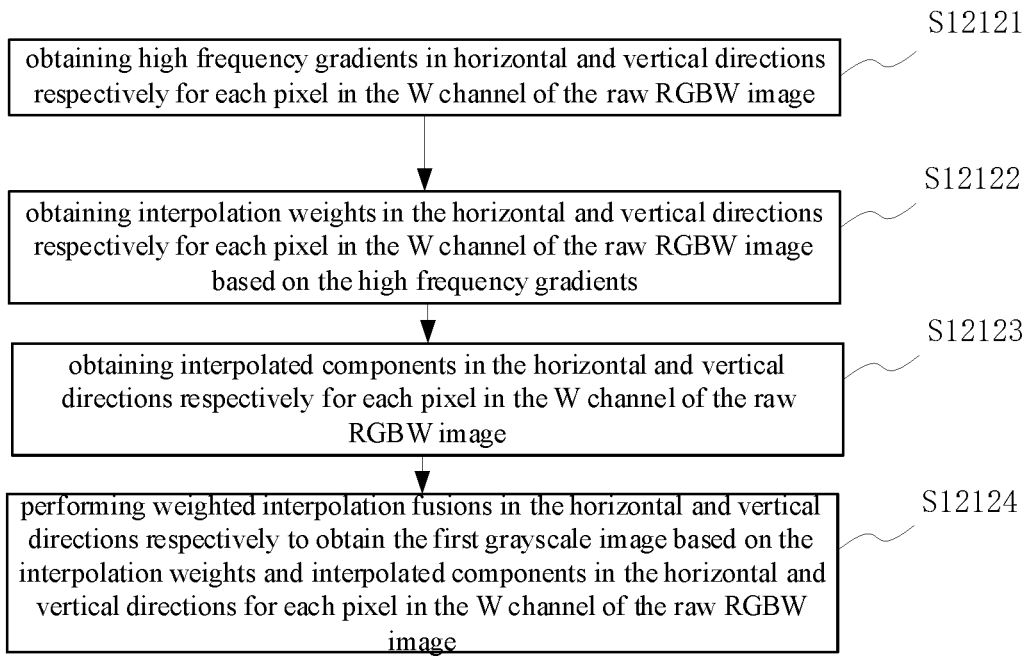
FIG. 3B shows a flowchart of operation S1212 of an image processing method according to one embodiment of the present disclosure.

Optionally, referring to FIG. 3B, operation S1212 may further include:

S12121, obtaining high frequency gradients in horizontal and vertical directions respectively for each pixel in the W channel of the raw RGBW image. Specifically, operation S12121 may be performed to obtain a high frequency gradient in the horizontal direction eh and a high frequency gradient in the vertical direction ev of each pixel in the W channel of the raw RGBW image according to a first filtering template, wherein the first filtering template is, for example, a template shown in Table 1.

TABLE 1

| first filtering template | | | | |
|---|---|---|---|---|
| 2 | −4 | 4 | −4 | 2 |

Optionally, operation S12121 may further include: performing Gaussian filtering on the high frequency gradient in the horizontal direction eh and the high frequency gradient in the vertical direction ev for each pixel in the W channel of the raw RGBW image, wherein the Gaussian filtering is carried out based on a second filtering template. The second filtering template is, for example, a template shown in Table 2.

TABLE 2

| second filtering template | | |
|---|---|---|
| 1 | 2 | 1 |
| 2 | 4 | 2 |
| 1 | 2 | 1 |

Optionally, operation S12121 may further include: offsetting the high-frequency gradient in the horizontal direction eh and the high-frequency gradient in the vertical direction ev for each pixel in the W channel of the raw RGBW image after the Gaussian filtering, for example, by setting an offset value hf offset for eh and ev, respectively, wherein the offset value may be set according to practical needs.

S12122, obtaining interpolation weights in the horizontal and vertical directions respectively for each pixel in the W channel of the raw RGBW image based on the high frequency gradients; The interpolation weights may include $$wet1 = \frac{eh}{eh + ev},$$

or, the interpolation weights may also include wet2=(1−(1−wet1)^5)·^22; it is to be noted that wet1 and wet2 are only two exemplary forms of the interpolation weights.

S12123, obtaining interpolated components in the horizontal and vertical directions respectively for each pixel in the W channel of the raw RGBW image. For example, the interpolated components in the horizontal and vertical directions for each pixel in the W channel of the raw RGBW image can be obtained by a demosaicing process.

S12124, performing weighted interpolation fusions in the horizontal and vertical directions respectively to obtain the first grayscale image based on the interpolation weights and interpolated components in the horizontal and vertical directions for each pixel in the W channel of the raw RGBW image.

As can be seen from the above description, a method to perform interpolation on the W channel of the raw RGBW image has been provided Other channels of the raw RGBW image can also be interpolated in a similar manner as operations S12121~S12124.

Figure 4A:
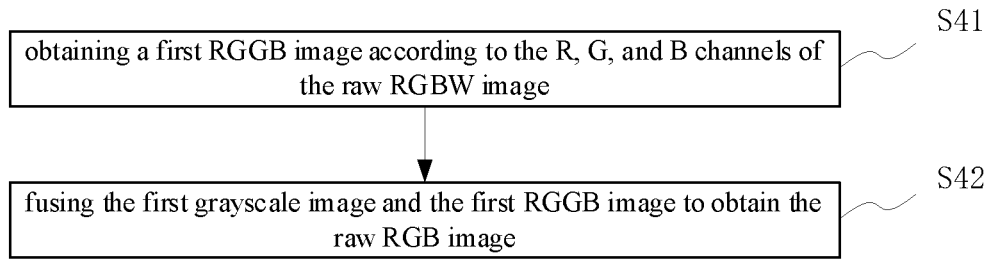
FIG. 4A shows a flowchart illustrating how to obtain a raw RGB image according to one embodiment of the present disclosure.
Figure 4B:
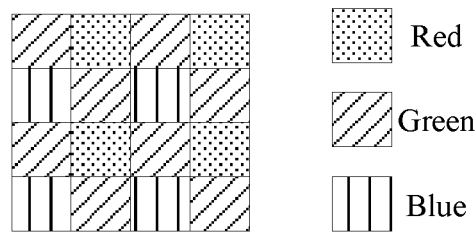
FIG. 4B shows an exemplary diagram of a first RGGB image obtained by an image processing method according to one embodiment of the present disclosure.

Referring to FIG. 4A, in an embodiment of the present disclosure, obtaining the raw RGB image, by the pre-processor, based on the first grayscale image and the R, G, and B channels of the raw RGBW image includes:

S41, obtaining a first RGGB image according to the R, G, and B channels of the raw RGBW image. For example, the raw RGBW image can be downsampled by 2×2 to obtain the first RGGB image. Alternatively, the first RGGB image can be obtained by separating the R, G, and B channels of the raw RGBW image, and then performing downsampling and fusion based on R, G, and B channels FIG. 4B shows an exemplary diagram of a first RGGB image obtained by an image processing method according to one embodiment of the present disclosure.

S42, fusing the first grayscale image and the first RGGB image to obtain the raw RGB image. Optionally, the raw RGB image obtained in operation S42 may have the same size as the raw RGWB image or the two may have different sizes.

Figure 4C:
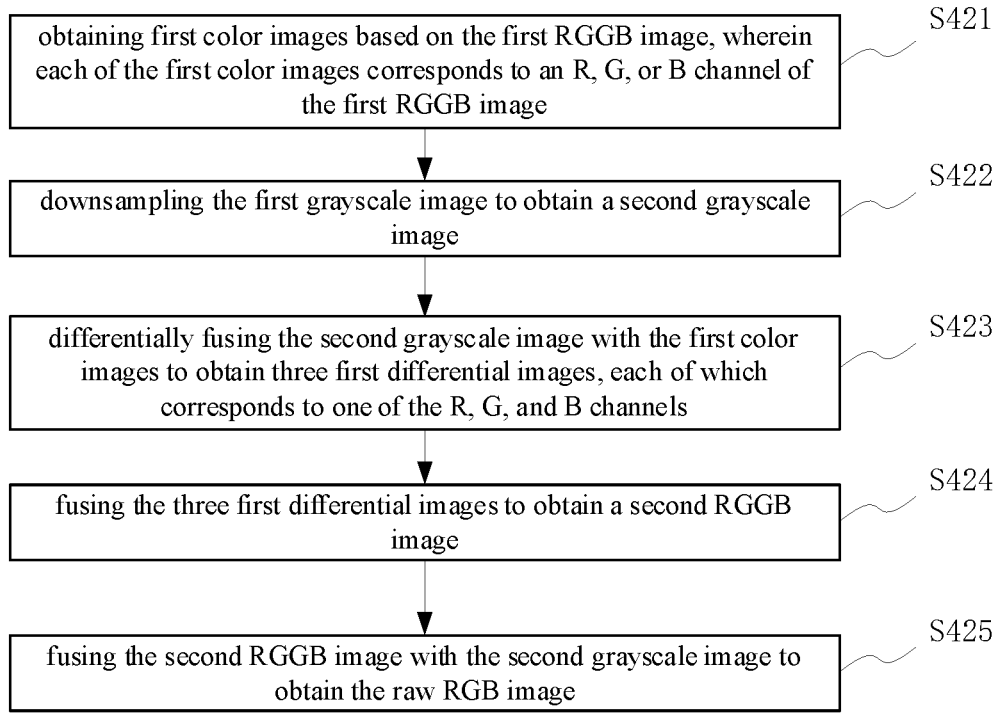
FIG. 4C shows a flowchart of operation S42 of an image processing method according to one embodiment of the present disclosure.
Figure 4D:
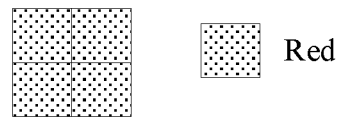
FIG. 4D-FIG. 4F show exemplary diagrams of color images corresponding to R, G, and B channels obtained by an image processing method according to one embodiment of the present disclosure.
Figure 4E:
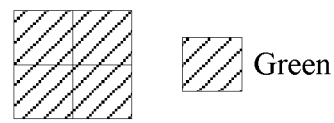
Figure 4F:
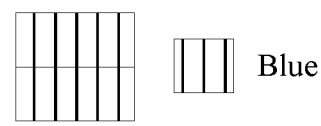
Figure 4G:
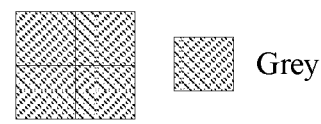
FIG. 4G shows an exemplary diagram of a second grayscale image obtained by an image processing method according to one embodiment of the present disclosure.

Optionally, referring to FIG. 4C, the raw RGB image may be obtained by:

S421, obtaining first color images based on the first RGGB image, wherein each of the first color images corresponds to an R, G, or B channel of the first RGGB image. FIG. 4D, FIG. 4E, and FIG. 4F show exemplary diagrams of the first color images corresponding to R, G, and B channels obtained by the image processing method according to one embodiment of the present disclosure S422, downsampling the first grayscale image to obtain a second grayscale image, wherein the second grayscale image has the same dimensions as the first color image, and the second grayscale image has the second resolution. FIG. 4G shows an exemplary diagram of the second grayscale image obtained by the image processing method according to one embodiment of the present disclosure.

S423, differentially fusing the second grayscale image with the first color images to obtain three first differential images, each of which corresponds to one of the R, G, and B channels; For example, a differencing process may be performed between the first color image of the R channel and the second grayscale image, between the first color image of the G channel and the second grayscale image, and between the first color image of the B channel and the second grayscale image, to obtain a first differential image of the R channel, a first differential image of the G channel, and a first differential image of the B channel, respectively.

Figure 4H:
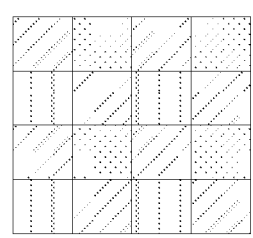
FIG. 4H shows an exemplary diagram of a second RGB image obtained by an image processing method according to one embodiment of the present disclosure.

S424, fusing the three first differential images to obtain a second RGGB image. Refer to FIG. 4H, which shows an exemplary diagram of the second RGB image.

S425, fusing the second RGGB image with the second grayscale image to obtain the raw RGB image, wherein the raw RGB image has the second resolution. The fusion between the second RGGB image and the second grayscale image may be performed by means of differential fusion, or by means of superposition, or by other means.

Operations S421 to S425 provide a way to obtain the raw RGB image based on the first grayscale image and the first RGGB image, in which case the raw RGB image can be obtained in a binning mode.

In addition, the operation S425 can also be replaced with: performing interpolation on the second RGGB image, and fusing an interpolated image resulted from the interpolation with the first grayscale image to obtain the raw RGB image, wherein the raw RGB image has the first resolution. Specifically, interpolating on the second RGGB image to obtain a fifth RGGB image of the same size as the first grayscale image, and fusing the fifth RGGB image with the first grayscale image to obtain the raw RGB image, in which case the raw RGB image can be obtained in a full mode.

Figure 4I:
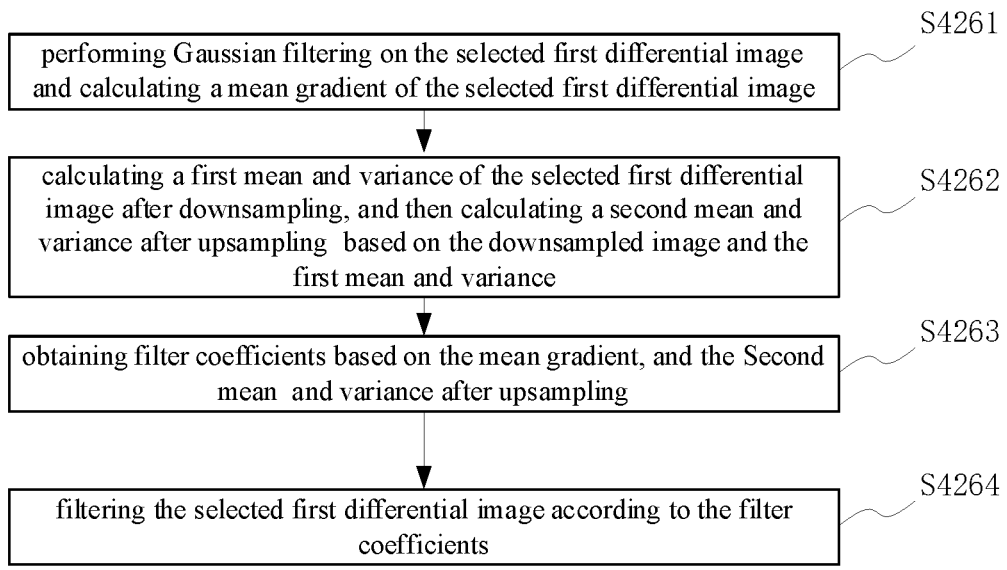
FIG. 4I shows a flowchart illustrating how to filter a differential image according to one embodiment of the present disclosure.

Optionally, after obtaining the three first differential images, the method further includes: filtering the three first differential images by the pre-processor, wherein the filtering may be achieved in various manners. For example, referring to FIG. 4I, the filtering of a selected first differential image of the three first differential images includes:

S4261, performing Gaussian filtering on the selected first differential image and calculating a mean gradient of the selected first differential image mean_local_grad, by the pre-processor.

S4262, calculating a mean Low_mean_I and variance Low_var_I of the selected first differential image after downsampling the selected first differential image, and then performing an upsampling based on the downsampled image in combination with the mean Low_mean_I and the variance Low_var_I to obtain a mean mean_I and variance var_I after upsampling, by the pre-processor.

S4263, obtaining, by the pre-processor, filter coefficients based on the mean gradient mean_local_grad, and the mean mean_I and variance var_I after upsampling. Specifically, the filter coefficients include first filter coefficients $a_k$ and second filter coefficients $b_k$, where $$a_k = \frac{\text{var\_I}}{\text{var\_I} + \alpha \times \text{mean\_local\_grad}^{2-\beta} + \varepsilon}, b_k = \text{mean\_I} \times (1 - a_k),$$

and $\alpha$, $\beta$ and $\varepsilon$ are constants, and the values of the three can be set according to actual needs. The first filter coefficients $a_k$ and the second filter coefficients $b_k$ in a given window are respectively averaged to obtain final filter coefficients $\bar{a}_1$ and $\bar{b}_1$, where $$\bar{a}_i = \frac{1}{|w|} \times \sum\nolimits_{k \in w_i} a_k,$$

and $|w|$ is the number of pixels in the given window.

S4264, filtering the selected first differential image according to the filter coefficients, by the pre-processor. Specifically, assuming the selected first differential image is p, for each pixel in the selected first differential image p, a filtered output can be obtained by filtering the image, and the filtered output is given by; after filtering each pixel in the image p, the filtering of the image p is completed.

It should be noted that the above-mentioned labels S4261 to S4264 are only used to identify different operations, not to limit the order of the operations, and the order of the above-mentioned operations may be adjusted according to actual needs; for example, operation S4262 can be executed before operation S4261, or operation S4262 and operation S4261 can be executed simultaneously.

Optionally, after the first differential images are filtered according to operations S4261 to S4264, the first differential images may also undergo median filtering, and the median filtering is, for example, a 5×5 median filtering.

Figure 5A:
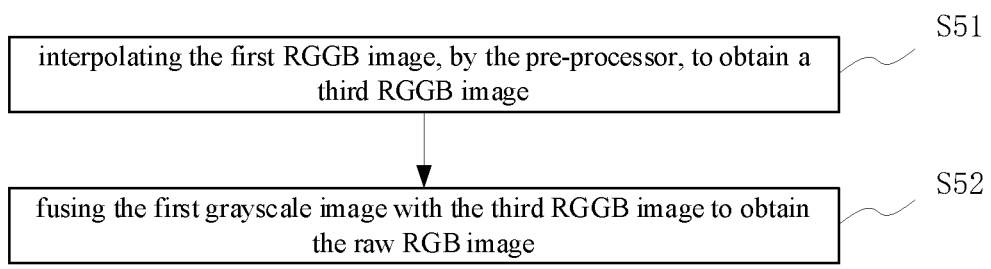
FIG. 5A shows a flowchart illustrating how to obtain a raw RGB image according to one embodiment of the present disclosure.

Referring to FIG. 5A, in an embodiment of the present disclosure, fusing the first grayscale image and the first RGGB image, by the pre-processor, to obtain the raw RGB image may also include:

S51, interpolating the first RGGB image, by the pre-processor, to obtain a third RGGB image, wherein the third RGGB image has the same dimensions as the first grayscale image. For example, interpolation of the first RGGB image may be achieved in a manner similar to operations S12121 to S12124.

S52, fusing the first grayscale image with the third RGGB image, by the pre-processor, to obtain the raw RGB image, wherein the raw RGB image has the first resolution.

Figure 5B:
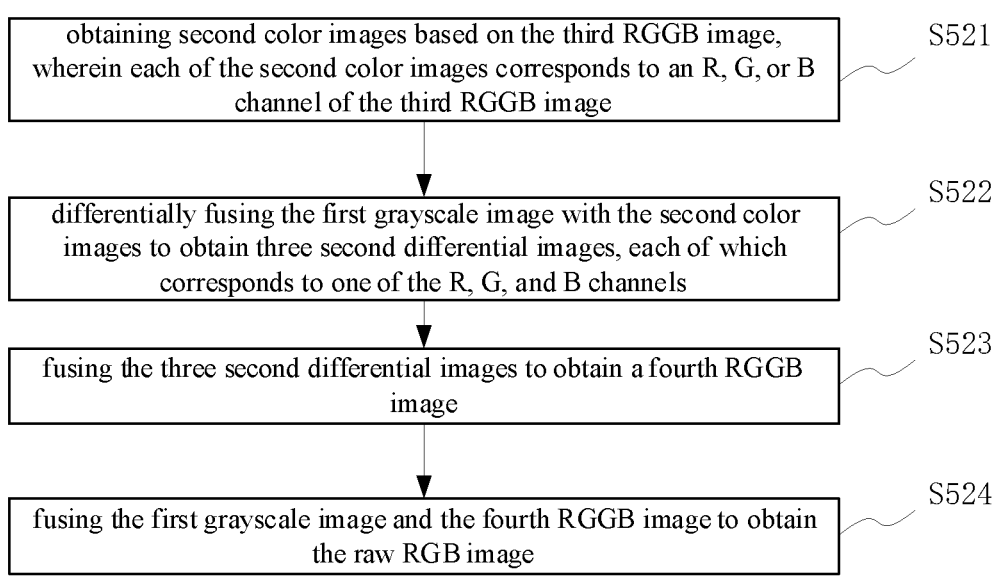
FIG. 5B shows a flowchart of operation S52 of an image processing method according to one embodiment of the present disclosure.

Referring to FIG. 5B, in an embodiment of the present disclosure, fusing the first grayscale image with the third RGGB image by the pre-processor includes:

S521, obtaining second color images based on the third RGGB image, wherein each of the second color images corresponds to an R, G, or B channel of the third RGGB image, which may be achieved by an operation similar to operation S421.

S522, differentially fusing the first grayscale image with the second color images to obtain three second differential images, each of which corresponds to one of the R, G, and B channels, which may be achieved by an operation similar to operation S423.

S523, fusing the three second differential images to obtain a fourth RGGB image, which may be achieved by an operation similar to operation S424.

S524, fusing the first grayscale image and the fourth RGGB image to obtain the raw RGB image, which may be achieved by an operation similar to operation S425.

As can be seen from the above, another method for obtaining the original RGB image is provided herein, which is capable of obtaining the raw RGB image in a full mode.

In an embodiment of the present disclosure, the image processing system further includes a post-processor, and the image processing method further includes: before processing the raw RGBW image by the pre-processor to obtain the raw RGB image, post-processing the raw RGB image by the post-processor to increase a clarity of the raw RGB image The post-processing involves, for example, a sharpening process.

Figure 6A:
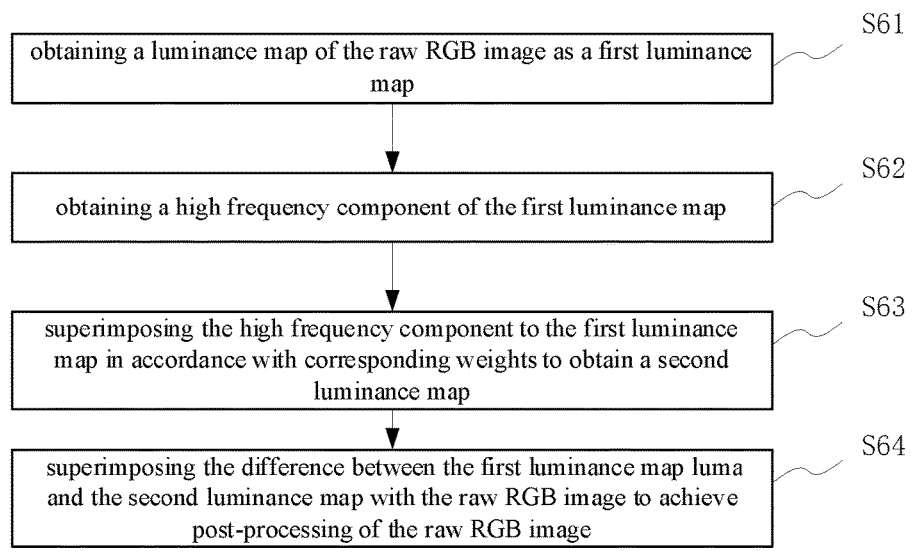
FIG. 6A shows a flowchart illustrating how to post-process a raw RGB image according to one embodiment of the present disclosure.
Figure 6B:
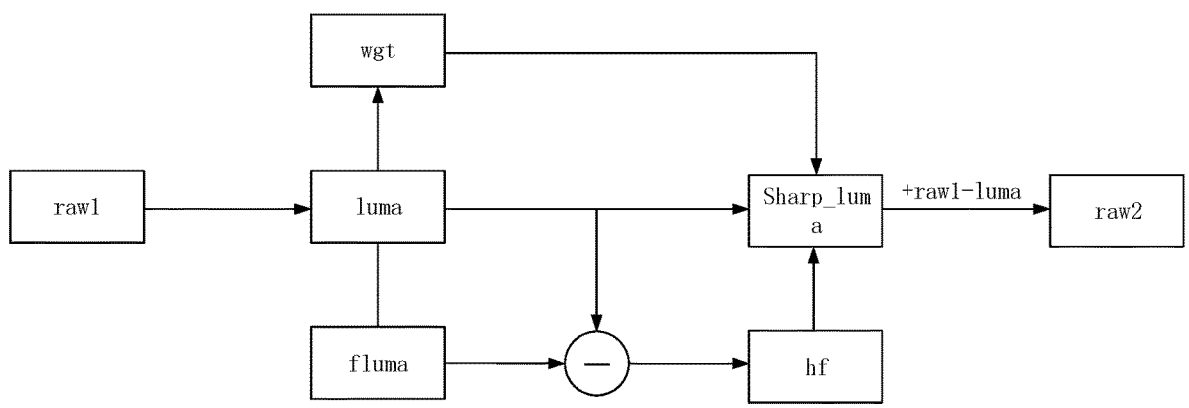
FIG. 6B shows a block diagram illustrating how to post-process a raw RGB image according to one embodiment of the present disclosure.

Optionally, referring to FIGS. 6A and 6B, post-processing of the raw RGB image by the post-processor may include:

S61, obtaining a luminance map of the raw RGB image raw1 as a first luminance map luma.

S62, obtaining a high frequency component hf of the first luminance map. Optionally, obtaining the high frequency component hf includes: filtering the first luminance map to obtain a Fluma map, and performing a differencing process between the first luminance map and the Fluma map to obtain the high frequency component Hf.

S63, superimposing the high frequency component hf to the first luminance map in accordance with corresponding weights to obtain a second luminance map Sharp_luma. Optionally, the weight wgt corresponding to the high frequency component can be obtained according to the first luminance map.

S64, superimposing the difference between the first luminance map luma and the second luminance map sharp_luma with the raw RGB image raw1 to achieve post-processing of the raw RGB image. The raw RGB image raw2 output at operation S64 can be represented as, for example, raw2=sharp_luma+raw1−luma.

Figure 7:
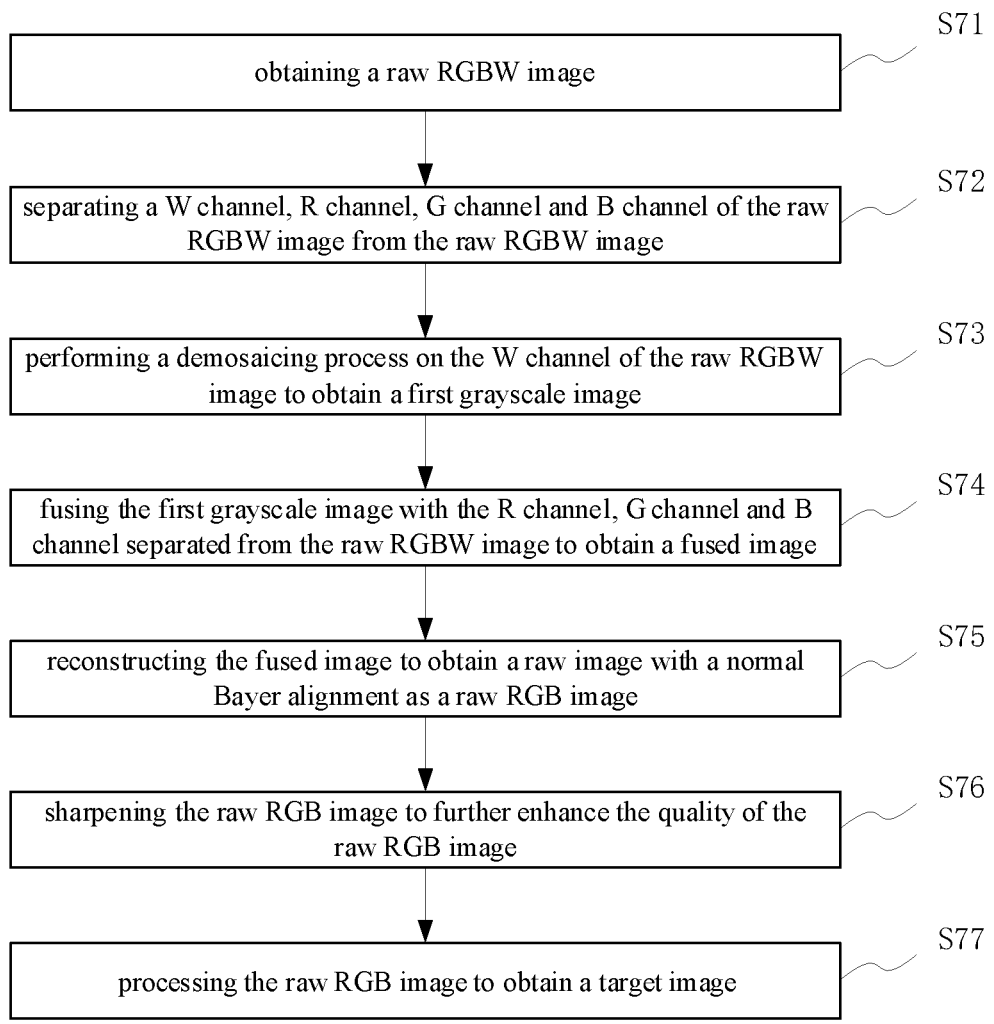
FIG. 7 shows a flowchart of an image processing method according to one embodiment of the present disclosure.

Referring to FIG. 7, in an embodiment of the present disclosure, the image processing method includes:

S71, obtaining a raw RGBW image by an RGBW sensor, wherein the raw RGBW image is a raw image in the Bayer format.

S72, separating a W channel, R channel, G channel and B channel of the raw RGBW image from the raw RGBW image by a pre-processor.

S73, performing a demosaicing process on the W channel of the raw RGBW image to obtain a first grayscale image, by the pre-processor.

S74, fusing the first grayscale image with the R channel, G channel and B channel separated from the raw RGBW image to obtain a fused image, by the pre-processor.

S75, reconstructing the fused image to obtain a raw image with a normal Bayer alignment as a raw RGB image, by the pre-processor.

S76, sharpening the raw RGB image to further enhance the quality of the raw RGB image, by the pre-processor.

S77, processing the raw RGB image to obtain a target image by an image signal processor.

As can be seen from above, an image processing method is provided, wherein the image processing method is capable of processing a raw RGBW image into a raw RGB image processable by an image signal processing module of any kind. Test results show that color moiré stripes can be mitigated by the image processing method, and the obtained target image has better clarity and color fidelity.

Figure 8:
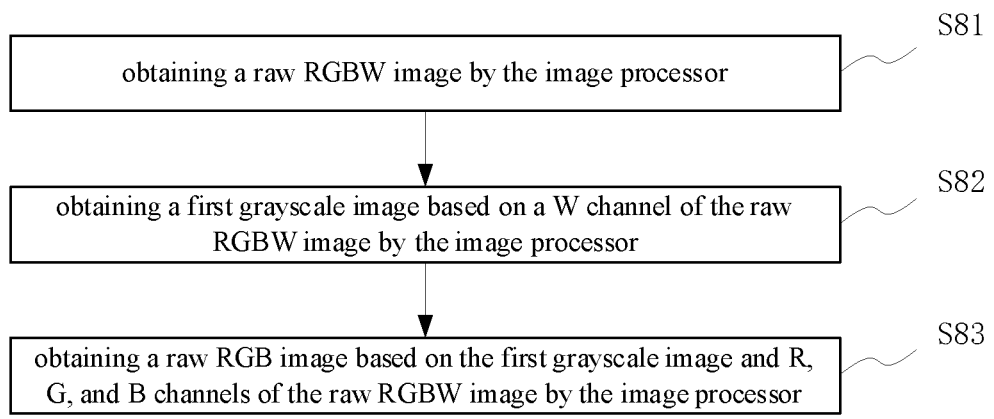
FIG. 8 shows a flowchart of an image processing method according to one embodiment of the present disclosure.

The present disclosure also provides another image processing method. Specifically, in an embodiment of the present disclosure, the image processing method is applied to an image processor, which may be an image signal processor or a processor other than an image signal processor. Referring to FIG. 8, the image processing method includes:

S81, obtaining a raw RGBW image by the image processor.

S82, obtaining a first grayscale image based on a W channel of the raw RGBW image by the image processor;

S83, obtaining a raw RGB image based on the first grayscale image and R, G, and B channels of the raw RGBW image by the image processor.

The operations S82 and S83 are the same as operations S121 and S122 shown in FIG. 2. It is understood that the relevant methods or examples such as those shown in FIGS. 3A~6B are equally applicable to the method of this embodiment, and the details or improvements related to operations S121 and S122 are also applicable to this embodiment.

The present disclosure also provides a computer-readable non-transitory storage medium on which a computer program is stored. The computer program, when executed by a processor, implements the image processing method shown in FIG. 1A, FIG. 7, or FIG. 8.

Figure 1B:
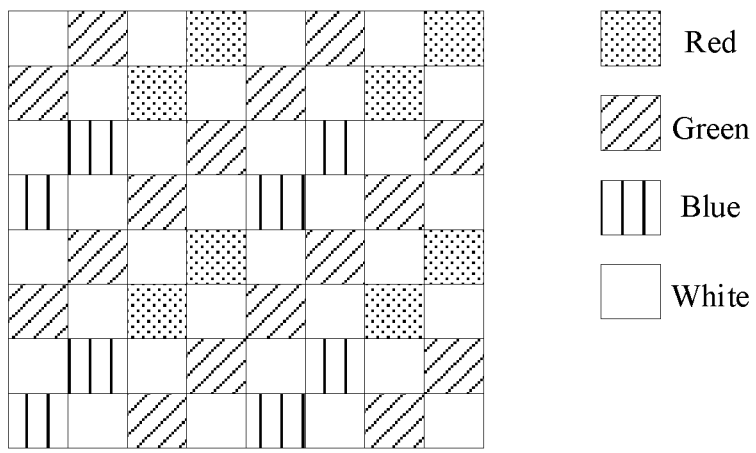
FIG. 1B shows an exemplary diagram of a raw RGBW image obtained by an image processing method according to one embodiment of the present disclosure.
Figure 1C:
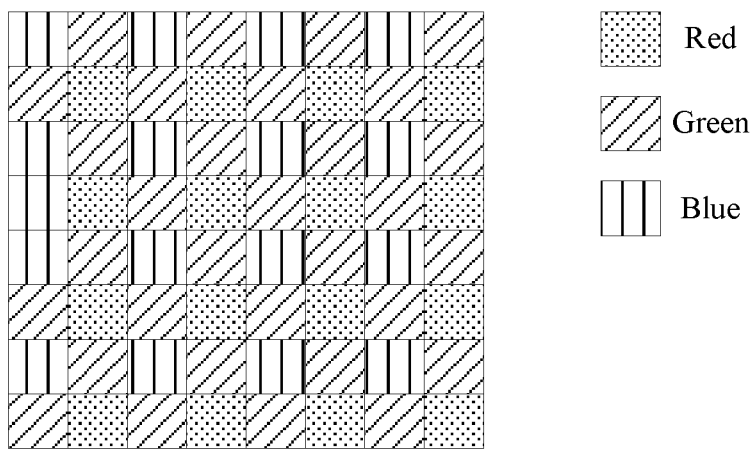
FIG. 1C shows an exemplary diagram of a raw RGB image obtained by an image processing method according to one embodiment of the present disclosure.

The present disclosure further provides a processor, for executing the image processing method shown in FIG. 1A, FIG. 7, or FIG. 8 when called by a computer program. The processor includes, but is not limited to, a processor integrated in a chip.

In particular, when the processor calls computer programs to perform the image processing method shown in FIG. 8, the processor may be provided between an image signal processor and an RGWB sensor so as to convert the original raw RGBW image obtained by the RGBW sensor into a raw RGB image, and the image signal processor obtains and processes the raw RGB image to obtain a target image.

Figure 9:
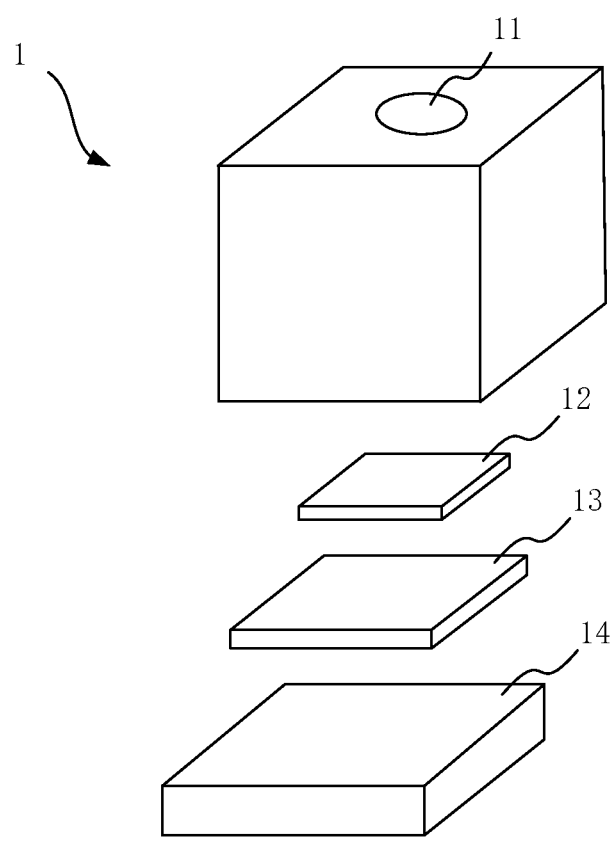
FIG. 9 shows a structural diagram of an electronic device according to one embodiment of the present disclosure.

The present disclosure also provides an electronic device. Specifically, referring to FIG. 9, in an embodiment of the present disclosure, the electronic device 1 includes a pre-processor 13 and an image signal processor 14. In some embodiments, the electronic device 1 may further include an RGBW sensor 12. The RGBW sensor 12 is configured to obtain a raw RGBW image. The pre-processor 13 is configured to process the raw RGBW image to obtain a raw RGB image. The image signal processor 14 is configured to process the raw RGB image to obtain a target image.

Optionally, the electronic device 1 may further include a lens 11. The lens 11 is configured to obtain a light signal, and the RGBW sensor 12 obtains the raw RGBW image based on the light signal.

Optionally, the pre-processor 13 and the image processor 14 process the raw RGBW image to obtain the target image using the image processing method shown in FIG. 1A or FIG. 7.

Optionally, the pre-processor 13 employs the image processing method shown in FIG. 8 to process the raw RGBW image to obtain the raw RGB image.

The scope of protection of the image processing method of the present disclosure is not limited to the order of execution of the operations enumerated herein, and any solution achieved by adding, subtracting, or replacing operations of the prior art according to the principles of the present disclosure is included in the scope of the present disclosure.

The image processing method described in the present disclosure can be used to realize realignment required by conversions from RGBW to RGB; and based on the image processing method, when an electronic device needs to be upgraded to support RGBW in addition to RGB, only a front-end sensor needs to be replaced, and there is no need for any modification to the image processing module, which reduces hardware costs. Moreover, the image processing method attends to both color and luminance characteristics, thus ensuring color fidelity while keeping the target image clear.

In addition, the image processing method can be configured to support different resolution settings when converting RGBW images to RGB image. For example, a full-resolution image in a full mode can be output during daytime when there is a high signal-to-noise ratio, and a high-quality binning-mode image synthesized from multi-pixels can be output at night when the lighting conditions are poor.

Further, the demosaic function included in the image processing method also supports RGBW sensors to directly output RGB images for display.

Therefore, the present disclosure effectively overcomes various shortcomings of the prior art and has a high value for industrial application.

The above-mentioned embodiments only exemplarily illustrate the principles and effects of the present disclosure, but are not used to limit the present disclosure. Any person skilled in the art may modify or change the above embodiments without violating the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. An image processing method, applied to an image processing system comprising an RGBW sensor, a pre-processor, and an image signal processor, wherein the image processing method comprises:
    obtaining a raw RGBW image by the RGBW sensor;
    processing the raw RGBW image by the pre-processor to obtain a raw RGB image; and
    processing the raw RGB image by the image signal processor to obtain a target image,
    wherein processing the raw RGBW image by the pre-processor to obtain the raw RGB image comprises:
    obtaining a first grayscale image, by the pre-processor, based on a W channel of the raw RGBW image; and
    obtaining the raw RGB image, by the pre-processor, based on the first grayscale image and R, G, and B channels of the raw RGBW image, wherein the raw RGB image has a first resolution identical to that of the first grayscale image, or has a second resolution different from that of the first grayscale image.

2. The image processing method of claim 1, wherein the image signal processor is configured to be not able to directly process the raw RGBW image.

3. The image processing method of claim 1, wherein processing the raw RGBW image by the pre-processor to obtain the raw RGB image comprises:
    performing a demosaicing process, by the pre-processor, on the raw RGBW image to directly convert the raw RGBW image into the raw RGB image.

4. The image processing method of claim 1, wherein the pre-processor determines a resolution of the raw RGB image based on lighting conditions corresponding to the raw RGBW image.

5. The image processing method of claim 1, wherein the pre-processor obtains the first grayscale image by:
    separating the W channel of the raw RGBW image from the raw RGBW image; and
    performing interpolation on the W channel of the raw RGBW image to obtain the first grayscale image.

6. The image processing method of claim 5, wherein performing interpolation on the W channel of the raw RGBW image to obtain the first grayscale image comprises:
    obtaining high frequency gradients in horizontal and vertical directions respectively for each pixel in the W channel of the raw RGBW image;
    obtaining interpolation weights in the horizontal and vertical directions respectively for each pixel in the W channel of the raw RGBW image based on the high frequency gradients;
    obtaining interpolated components in the horizontal and vertical directions respectively for each pixel in the W channel of the raw RGBW image; and
    performing weighted interpolation fusions in the horizontal and vertical directions respectively to obtain the first grayscale image based on the interpolation weights and interpolated components in the horizontal and vertical directions for each pixel in the W channel of the raw RGBW image.

7. The image processing method of claim 1, wherein obtaining the raw RGB image, by the pre-processor, based on the first grayscale image and the R, G, and B channels of the raw RGBW image comprises:
    obtaining a first RGGB image according to the R, G, and B channels of the raw RGBW image; and
    fusing the first grayscale image and the first RGGB image to obtain the raw RGB image.

8. The image processing method of claim 7, wherein fusing the first grayscale image and the first RGGB image, by the pre-processor, to obtain the raw RGB image comprises:
    obtaining first color images based on the first RGGB image, wherein each of the first color images corresponds to a R, G, or B channel of the first RGGB image;
    downsampling the first grayscale image to obtain a second grayscale image, wherein the second grayscale image has the same dimensions as the first color images, and the second grayscale image has the second resolution;
    differentially fusing the second grayscale image with the first color images to obtain three first differential images, each of which corresponds to one of the R, G, and B channels;
    fusing the three first differential images to obtain a second RGGB image; and
    performing interpolation on the second RGGB image, and fusing an interpolated image resulted from the interpolation with the first grayscale image to obtain the raw RGB image, wherein the raw RGB image has the first resolution; or
    fusing the second RGGB image with the second grayscale image to obtain the raw RGB image, wherein the raw RGB image has the second resolution.

9. The image processing method of claim 8, wherein, after obtaining the three first differential images, the image processing method further comprises:
    filtering the three first differential images by the pre-processor.

10. The image processing method of claim 9, wherein the filtering of a selected first differential image of the three first differential images comprises:
    performing, by the pre-processor, Gaussian filtering on the selected first differential image and calculating a mean gradient of the selected first differential image;
    calculating, by the pre-processor, a first mean and variance of the selected first differential image after downsampling the selected first differential image, and then performing an upsampling based on the downsampled image in combination with the first mean and variance to obtain a second mean and variance after upsampling;
    obtaining, by the pre-processor, filter coefficients based on the mean gradient, and the second mean and variance after upsampling; and filtering, by the pre-processor, the selected first differential image according to the filter coefficients.

11. The image processing method of claim 7, wherein fusing the first grayscale image and the first RGGB image, by the pre-processor, to obtain the raw RGB image comprises:
interpolating the first RGGB image, by the pre-processor, to obtain a third RGGB image, wherein the third RGGB image has the same dimensions as the first grayscale image; and
fusing the first grayscale image with the third RGGB image, by the pre-processor, to obtain the raw RGB image, wherein the raw RGB image has the first resolution.

12. The image processing method of claim 11, wherein fusing the first grayscale image with the third RGGB image, by the pre-processor, to obtain the raw RGB image comprises:
obtaining second color images based on the third RGGB image, wherein each of the second color images corresponds to an R, G, or B channel of the third RGGB image;
differentially fusing the first grayscale image with the second color images to obtain three second differential images, each of which corresponds to one of the R, G, and B channels;
fusing the three second differential images to obtain a fourth RGGB image; and
fusing the first grayscale image and the fourth RGGB image to obtain the raw RGB image.

13. The image processing method of claim 1, wherein the image processing system further comprises a post-processor, and the image processing method further comprises:
before processing the raw RGBW image by the pre-processor to obtain the raw RGB image, post-processing the raw RGB image by the post-processor to increase clarity of the raw RGB image.

14. The image processing method of claim 13, wherein post-processing the raw RGB image by the post-processor comprises:
obtaining, by the post-processor, a luminance map of the raw RGB image as a first luminance map;
obtaining, by the post-processor, a high frequency component of the first luminance map;
superimposing, by the post-processor, the high frequency component to the first luminance map in accordance with corresponding weights to obtain a second luminance map; and
superimposing, by the post-processor, a difference between the second luminance map and the first luminance map to the raw RGB image.

15. An image processing method, applied to an image processor, wherein the image processing method comprises:
obtaining a raw RGBW image by the image processor;
obtaining a first grayscale image based on a W channel of the raw RGBW image by the image processor; and
obtaining a raw RGB image based on the first grayscale image and R, G, and B channels of the raw RGBW image by the image processor.

16. An electronic device, comprising:
a pre-processor configured to receive a raw RGBW image from a RGBW sensor, and process the raw RGBW image to obtain a raw RGB image; and
an image signal processor configured to process the raw RGB image to obtain a target image,
wherein the pre-processor is configured to:
obtain a first grayscale image based on a W channel of the raw RGBW image; and
obtain the raw RGB image based on the first grayscale image and R, G, and B channels of the raw RGBW image, wherein the raw RGB image has a first resolution identical to that of the first grayscale image, or has a second resolution different from that of the first grayscale image.

17. The electronic device of claim 16, wherein the image signal processor is configured to be not able to directly process the raw RGBW image.

18. The electronic device of claim 16, wherein the pre-processor is configured to:
perform a demosaicing process on the raw RGBW image to directly convert the raw RGBW image into the raw RGB image.

* * * * *